(12) United States Patent
Cherry

(10) Patent No.: US 9,512,884 B2
(45) Date of Patent: Dec. 6, 2016

(54) SELF-ALIGNING AXIAL DRIVE COUPLING

(71) Applicant: Deere & Company, Moline, IL (US)

(72) Inventor: Brandon C. Cherry, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 84 days.

(21) Appl. No.: 14/570,818

(22) Filed: Dec. 15, 2014

(65) Prior Publication Data

US 2016/0169292 A1    Jun. 16, 2016

(51) Int. Cl.
*A01C 19/02* (2006.01)
*F16D 1/112* (2006.01)
*F16D 1/10* (2006.01)
*A01C 7/04* (2006.01)

(52) U.S. Cl.
CPC .............. *F16D 1/112* (2013.01); *A01C 19/02* (2013.01); *A01C 7/046* (2013.01); *F16D 2001/103* (2013.01)

(58) Field of Classification Search
CPC ...... F16B 21/00; F16D 3/04; F16D 2001/103; B25G 3/28; A01C 9/00; A01C 19/02
USPC ........ 403/322.1, 359.4, 359.6; 464/104–106, 464/149, 177, 169, 167; 111/178, 184, 185; 81/460
See application file for complete search history.

(56) References Cited

U.S. PATENT DOCUMENTS

| | | | | |
|---|---|---|---|---|
| 308,247 A * | 11/1884 | Frearson | ............... | B25B 15/005 81/460 |
| 2,471,982 A * | 5/1949 | Shulda | ...................... | F16C 3/12 403/359.6 |
| 3,553,626 A * | 1/1971 | Kohler | ...................... | H03J 1/06 338/128 |
| 4,359,952 A * | 11/1982 | Gesior | ..................... | A01C 7/06 111/186 |
| 4,601,372 A * | 7/1986 | Swales | ................... | A01C 7/046 192/69.7 |
| 5,024,173 A * | 6/1991 | Deckler | .................. | F16D 11/14 111/178 |
| 6,651,569 B2 * | 11/2003 | Audigie | ................. | A01C 19/00 111/178 |
| 6,834,749 B1 * | 12/2004 | Johnson | .................. | F16D 43/26 192/20 |
| 8,151,718 B2 * | 4/2012 | Mariman | ............... | A01C 7/102 111/164 |
| 9,121,438 B2 * | 9/2015 | Mascari | .................... | F16C 1/02 |
| 2005/0284350 A1 * | 12/2005 | Ptacek | ................... | A01C 19/00 111/177 |
| 2006/0112797 A1 * | 6/2006 | Zucker | .................. | B25B 15/005 81/460 |
| 2011/0123264 A1 * | 5/2011 | Wang | ...................... | F16D 1/033 403/359.6 |

* cited by examiner

*Primary Examiner* — John G Weiss

(57) ABSTRACT

A self-aligning and self-engaging drive coupling on a seeding machine planting unit allows for one drive or driven device of the planting unit to be moved between a use position and a service position without the need to manually connect or disconnect the drive coupling between the two devices.

13 Claims, 10 Drawing Sheets

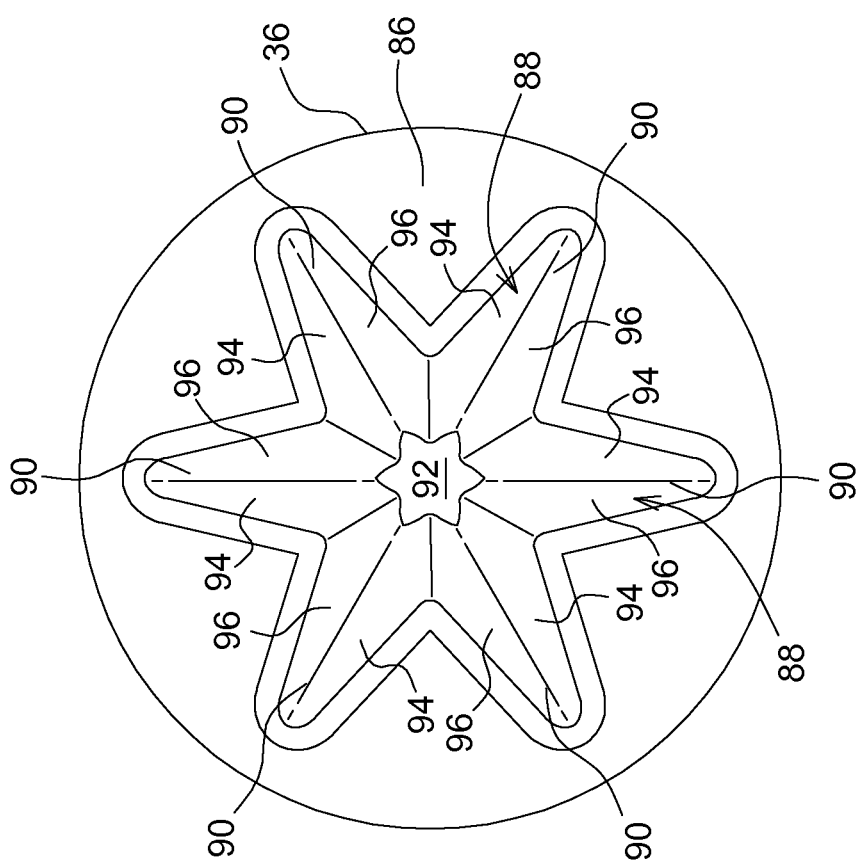

SELF-ALIGNING AXIAL DRIVE COUPLING

FIELD OF THE DISCLOSURE

The following relates to planting units for a seeding machine or planter, including planting units having seed meters.

BACKGROUND OF THE DISCLOSURE

Various types of planting units for a seeding machine have been developed, many of which use a seed meter that is driven rotationally. In some configurations, the seed meter is driven by a ground wheel on the planting machine mechanically coupled to the seed meter by a shaft extending laterally of the machine with chains or cables connecting the shaft to each seed meter. In other configurations, the cross shaft may be coupled to a motor for rotation instead of the ground wheel. In other configurations of planting units, the seed meters may be separately driven by motors, such as electric, hydraulic or pneumatic. It may be useful to be able to easily de-couple the meter from the drive motor for servicing of the planting unit. Accordingly, a drive coupling between the motor and seed meter that is self-aligning and which is easily coupled and de-coupled is desired.

SUMMARY OF THE DISCLOSURE

A self-aligning and self-engaging drive coupling on a seeding machine planting unit is disclosed. The drive coupling allows for one drive or driven device of the planting unit to be moved between a use position and a service position without the need to manually connect or disconnect the drive coupling between the two devices.

Various other embodiments are contemplated, within the scope of the discussion herein.

BRIEF DESCRIPTION OF THE DRAWINGS

FIG. 9 is an end view of the driven member of the drive coupling;

DETAILED DESCRIPTION

The following describes one or more example embodiments of the disclosed self-aligning axial drive coupling, as shown in the accompanying figures of the drawings described briefly above. Various modifications to the example embodiments may be contemplated by one of skill in the art.

Figure 1:
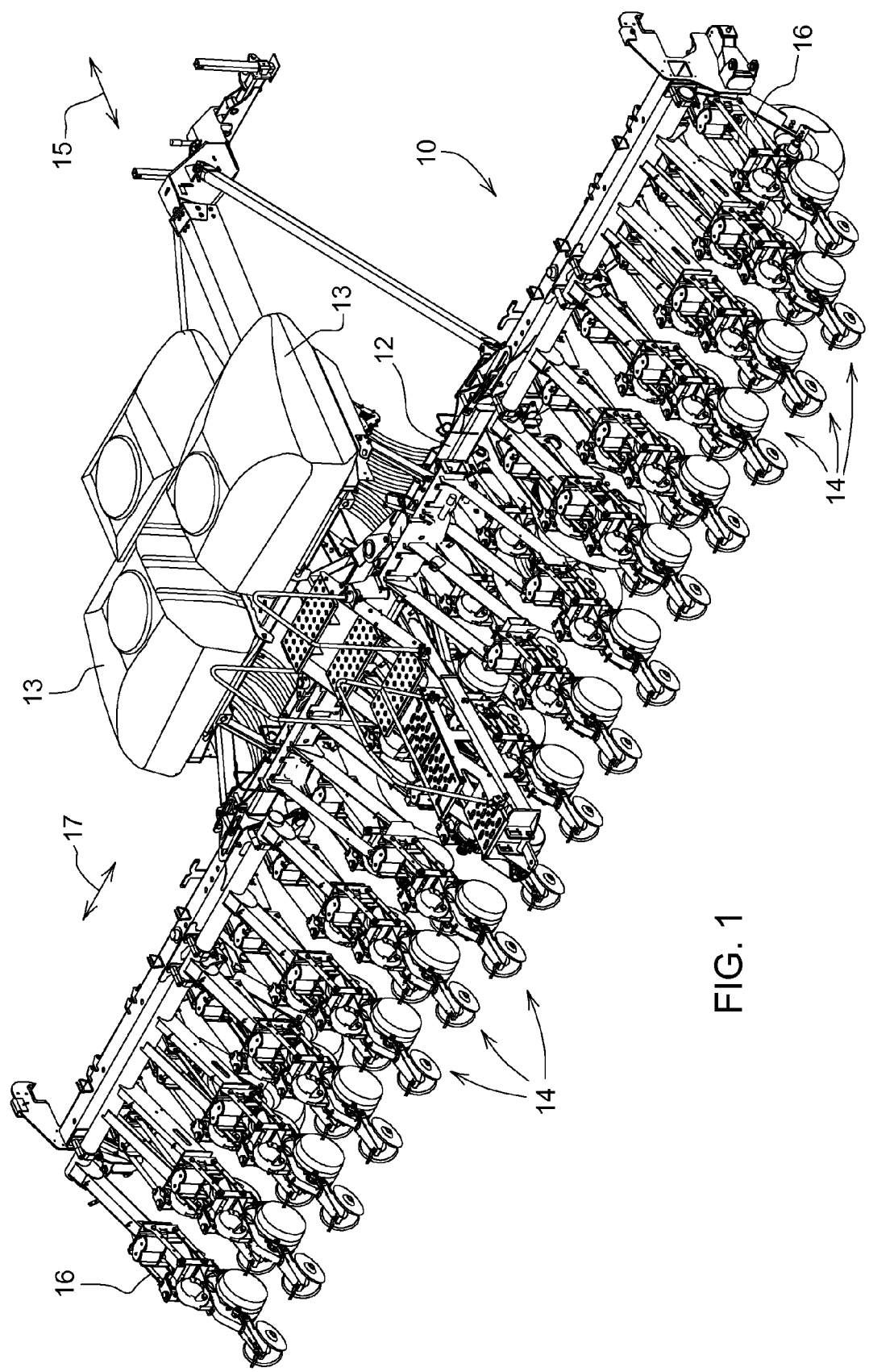
FIG. 1 is a perspective view of a common agricultural planter.

Referring now to FIG. 1, example agricultural seeding machine 10 is shown as a row crop planter. It will be understood that various other configurations may also be possible and that the disclosed self-aligning axial drive coupling may be used in a variety of agricultural machinery or other settings. Seeding machine 10 may include central frame 12 on which a plurality of individual planting units 14 may be mounted. Seeding machine 10 may be oriented with a fore-aft direction shown by arrow 15 and a transverse direction shown by arrow 17. Each planting unit 14 may be coupled to central frame 12 by a parallel linkage (e.g. linkage 16) so that individual planting units 14 may move up and down to a limited degree relative to frame 12. Large storage tanks 13 may hold seed that may be delivered pneumatically to a mini-hopper on each planting unit.

Figure 2:
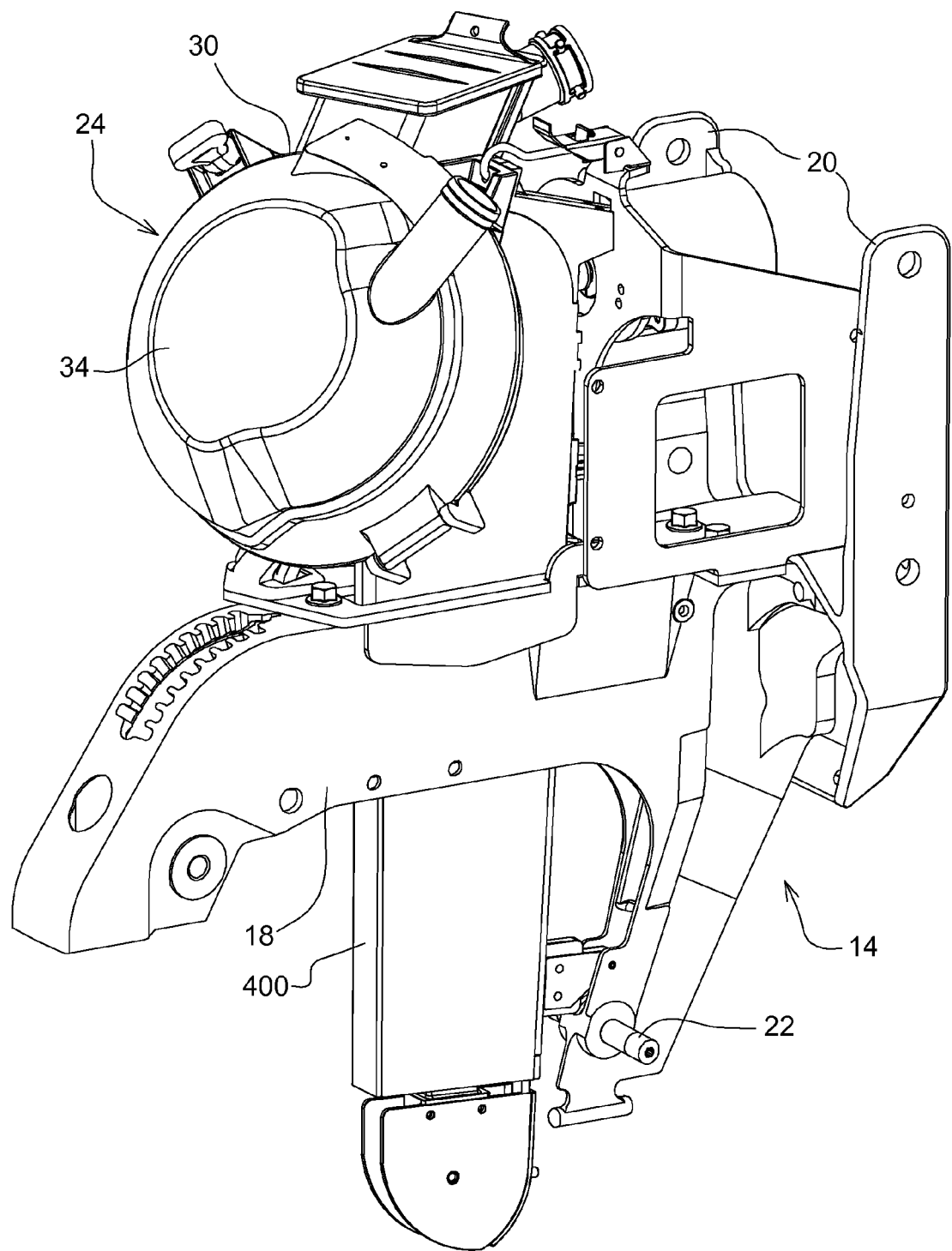
FIG. 2 is a side perspective view of a planting unit frame, seed meter and seed delivery system.

Referring also to FIG. 2, each planting unit 14 may be mounted, in various known ways, to frame member 18. Frame member 18 may include a pair of upstanding arms 20 at the forward end thereof. Arms 20 may be coupled to the rearward ends of parallel linkage 16. Furrow opening disks 28 (FIG. 1) may be attached to shaft 22 in a known manner to form an open furrow in the soil beneath the seeding machine into which seed is deposited. Closing and packing wheels 32 (FIG. 1) may also be mounted to frame member 18 in a known manner to close the furrow over the deposited seed and to firm the soil in the closed furrow. Seed meter 24 and seed delivery system 26 may also be attached to the frame member 18 of the planting unit.

Figure 3:
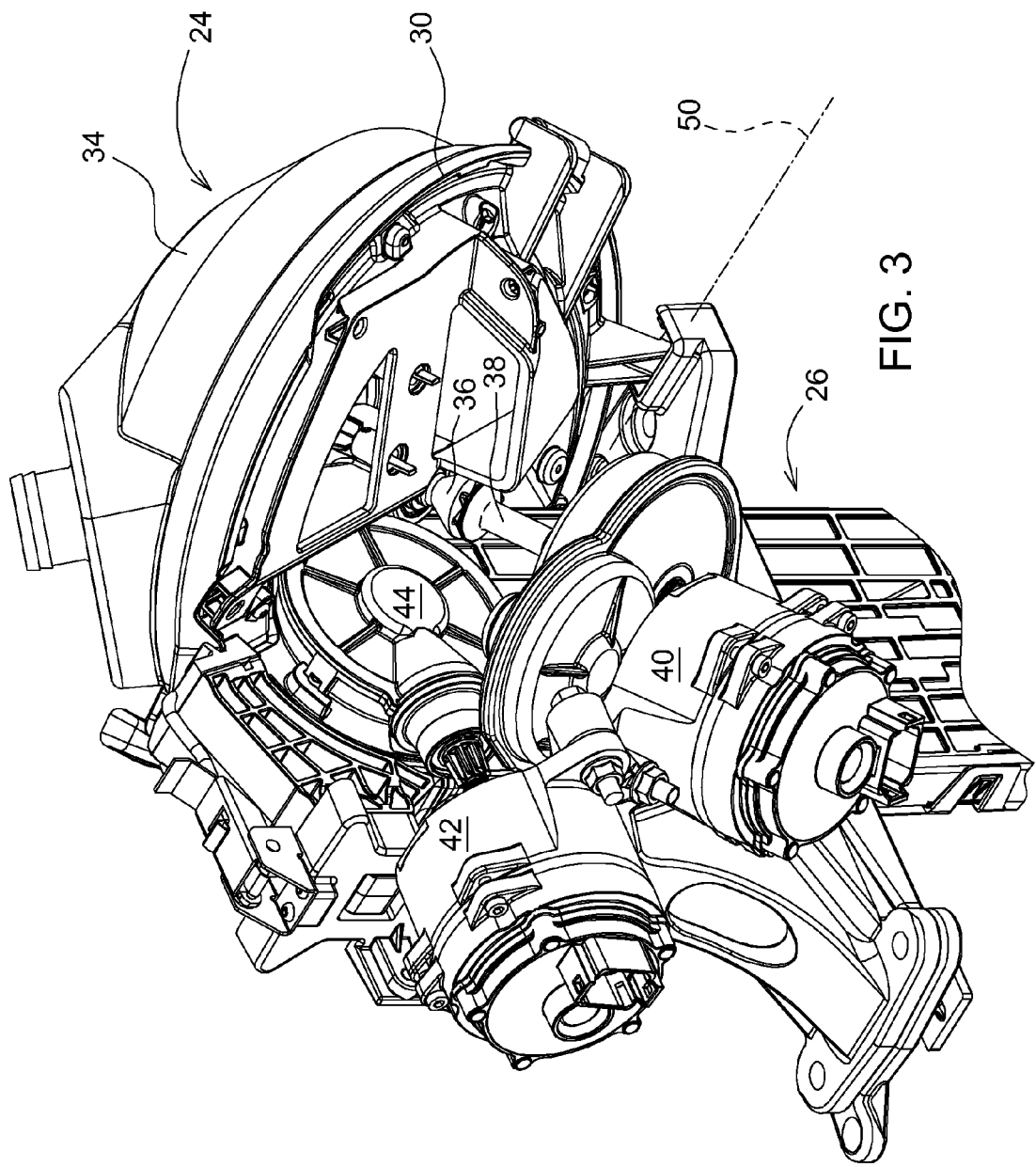
FIG. 3 is an enlarged perspective view of the seed meter and delivery system drives.
Figure 4:
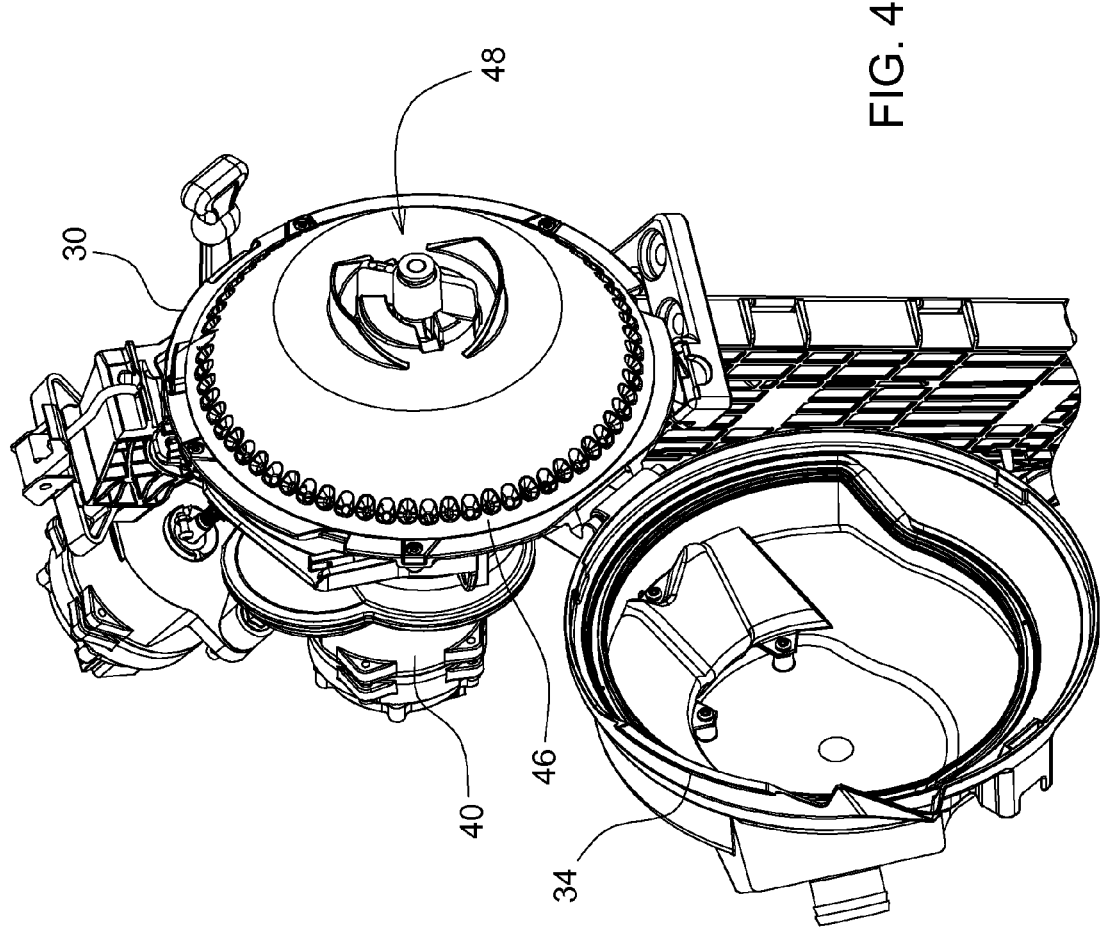
FIG. 4 is a perspective view of the seed meter with the cover open illustrating the metering member.

Referring also to FIGS. 3 and 4, seed meter 24 may include housing 30 and cover 34. Housing 30 and the cover 34 may be coupled to one another by complementary hinge features on housing 30 and cover 34, respectively. Drive spindle, or driven member, 36 may be carried by the housing 30 and may be coupled to output shaft, or drive member, 38 of electric motor 40, in order to drive the seed meter when in the assembled use position shown in FIG. 3. The seed meter 24 may include a rotatable metering member 46, FIG. 4 mounted to the driven member 36 by hub assembly 48.

Seed meter 24 may be pivotally mounted to the planting unit frame 18 for rotation about axis 50 shown in FIG. 3. The seed meter is movable about the axis 50 between the assembled, use position shown in FIG. 3 and a service position shown in FIG. 5. In the service position, the driven member 36 may be de-coupled from the drive member 38. The drive member 38 and the driven member 36 are first and second members of a drive coupling 52. As described below, the drive coupling may be self-aligning and self-engaging when the seed meter 24 is moved into the use position without the use of any fasteners or effort on the part of an operator to secure coupling of the drive member 38 and the driven member 36. In the illustrated embodiment, the drive coupling first member is the drive member 38 while the drive coupling second member is the driven member 36.

Figure 6:
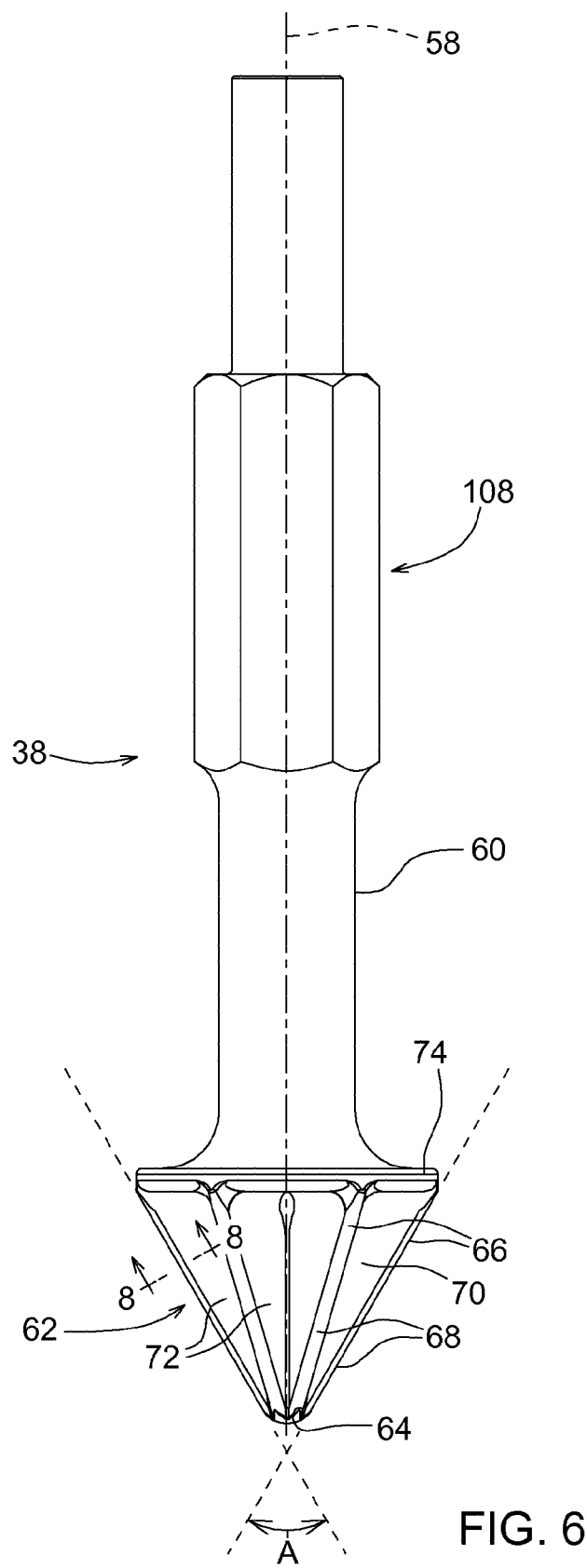
FIG. 6 is a side view of the drive member of a drive coupling.
Figure 8:
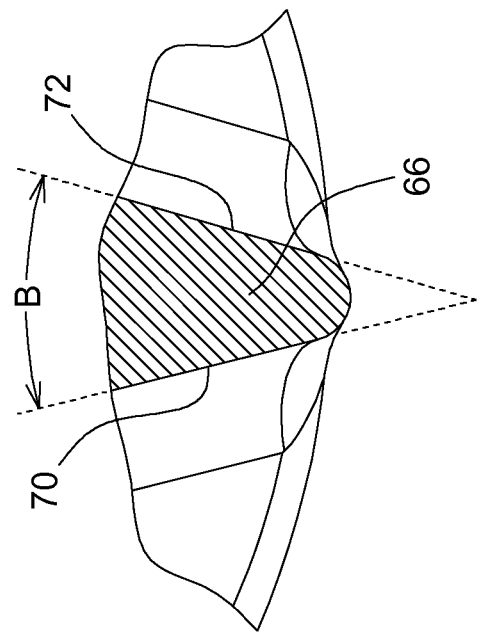
FIG. 8 is a section view along the line 8-8 of FIG. 6.
Figure 7:
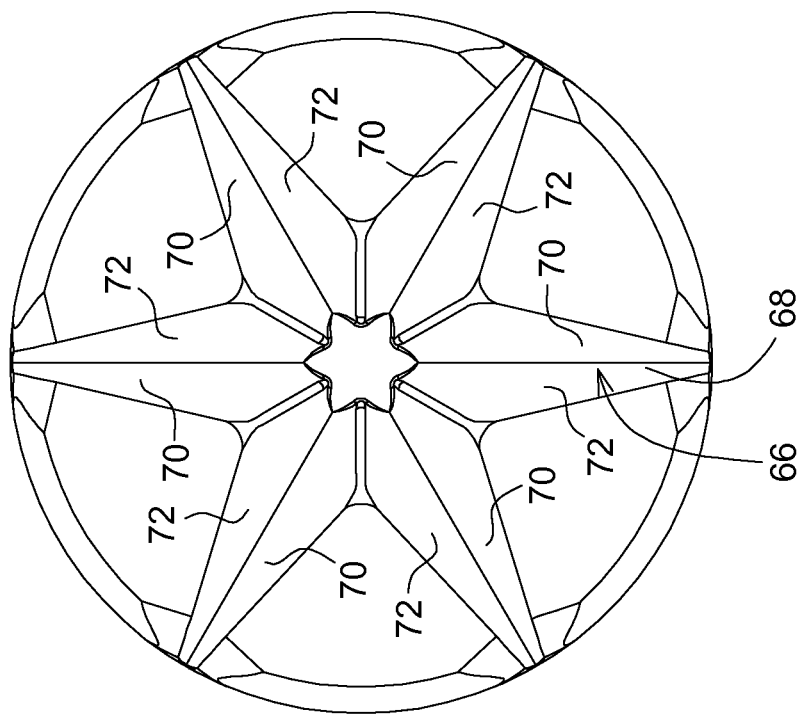
FIG. 7 is an end view of the drive member of FIG. 6.

The drive coupling drive member 38 may be coupled to the output shaft of the motor 40 for rotation therewith as described below. The drive member 38 may have an axially extending shank 60 with a cone shaped tip 62 at a distal end 64 of the shank 60. The cone shaped tip may be formed of a plurality of vanes 66 extending axially of the shank 60. The vanes have radially outer edges 68 that diverge from one another radially outwardly from the distal end to form the cone shape. The outer edge of the vanes 66 diverge from the outer edge of the opposite vane at an angle "A" of less than 70 degrees and may be approximately 60 degrees as shown in FIG. 6. The smaller the cone angle A, the longer will be the cone in an axial direction for a given diameter at the base flange 74. The vanes extend radially outward from the axis a distance greater than the diameter of the shank 60 at the base where the vanes 66 join the base flange 74. Base flange 74 provides support for the flanges in a circumferential direction to increase the torque transmitted by the vanes without bending of the vanes. By extending outwardly further then the shank diameter, the torque transmitted by the vanes can be increased as the load is centered a greater distance from the shank axis 58. Each vane 66 has a pair of side walls 70 and 72 that are generally flat as shown in FIGS. 6 and 7. The side wall 70 and side wall 72 may diverge from one another in a radially inwardly direction from the out edge 68. The divergence of the vane side walls 70 and 72 may enhance the manufacturability of the drive member 38. As shown in FIG. 8, the vane side walls may diverge at an angle of approximately 26 degrees relative to one another. In other embodiments the angle of divergence of the vane side walls may be any angle less than 40 degrees. In still further embodiments, the angle of divergence of the vane side walls may be any angle between 20 and 40 degrees. Drive member 66 may have a plurality of vanes 66. In the illustrated embodiment, the drive member 38 may have six vanes 66. In other embodiments, the drive member 66 may have five or four vanes 66. Although any number of vanes may be used.

Figure 10:
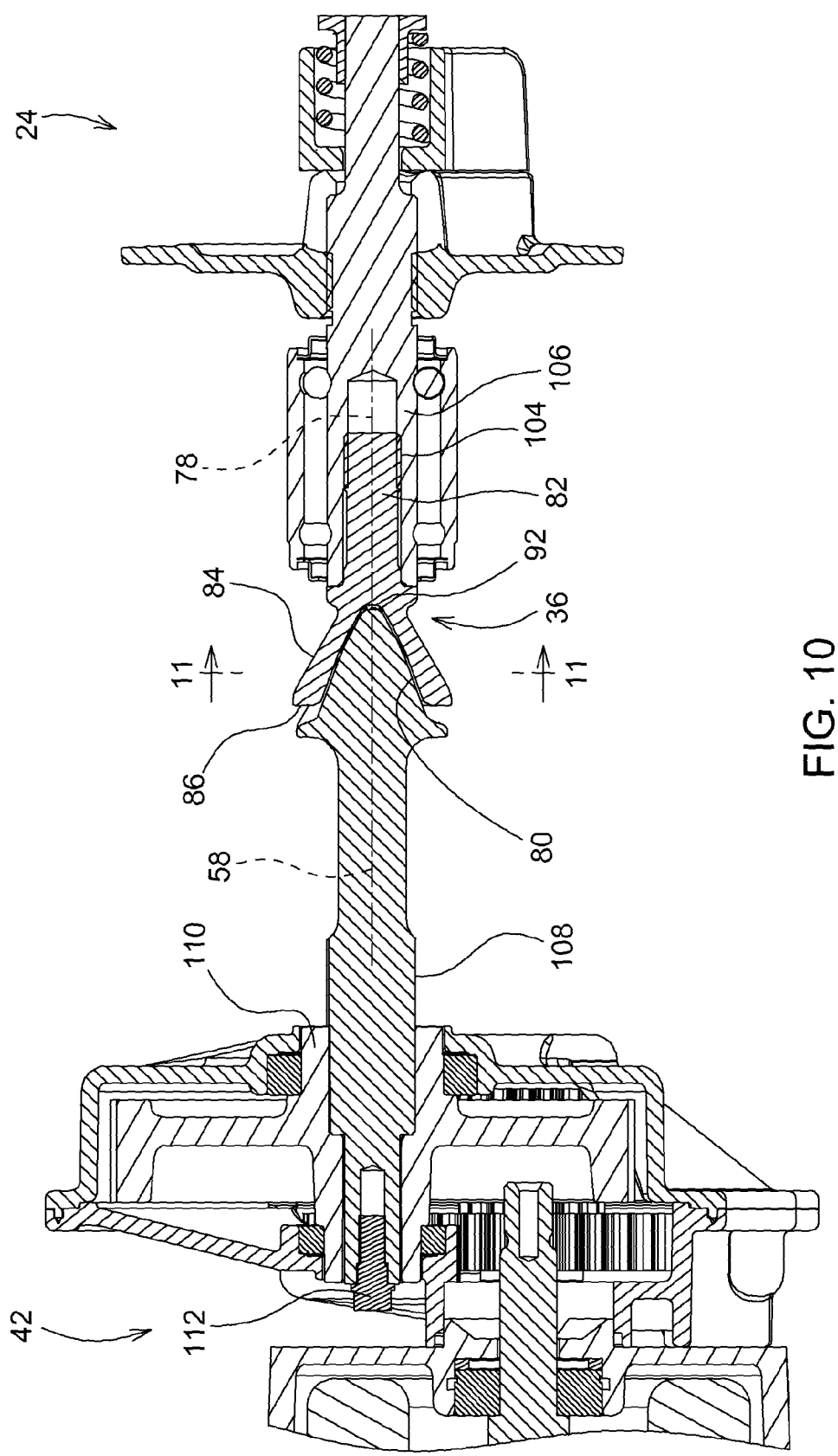
FIG. 10 is a sectional view of the drive coupling in a coupled position.

The cone shaped tip 62 of the drive member 38 may be coupled to the driven member 36 by insertion of the tip 62 into a complementary recess 80 in a distal end of the driven member 36, FIG. 9. The driven member 36 also may include a shank 82 and an enlarged head 84 at the distal end. The recess 80 extends axially into the head 84 at the end 86 about a shank axis 78 shown in FIG. 10. The recess 80 is formed of plurality of radial grooves 88 that extend axially into the head 84. The grooves 88 have a bottom surface 90 with the bottom surfaces of the grooves converging axially inwardly to a tip 92 at an inner end of the recess. The grooves 88 may have flat side walls 94 and 96. When the drive member 38 is coupled to the driven member 36, the flat side walls 70 and 72 may engage the side walls 94 and 96 of the driven member in surface-to-surface contact. The groove side walls 94 and 96 may diverge from one another as they extend away from the bottom surface 90 of each groove. The number of grooves matches the number of vanes on the drive member 38. As such, there are a plurality of grooves. In the illustrated embodiment, there are six grooves. In other embodiments, there may be five or four grooves.

Figure 5:
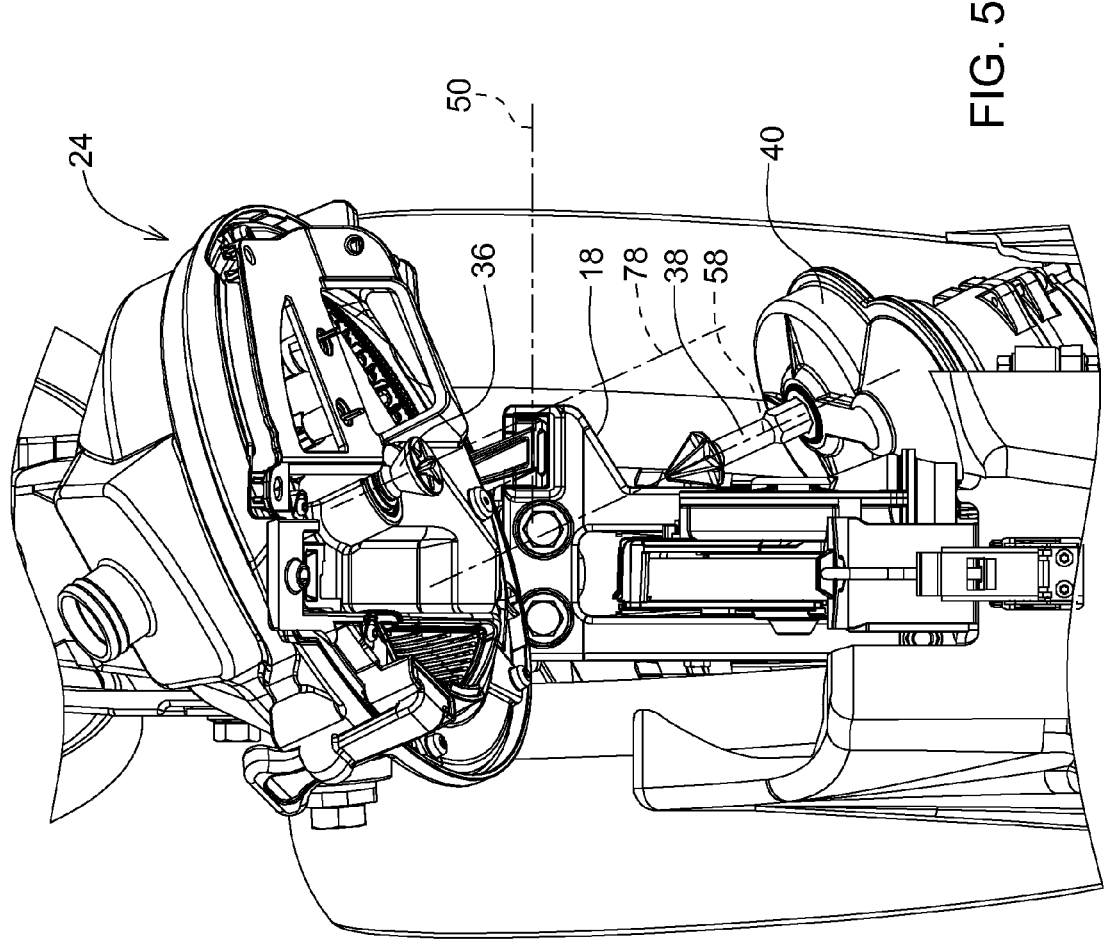
FIG. 5 is a top view of the planting unit illustrating the seed meter in a service position.

Referring to FIG. 5, when the seed meter 24 is moved from the service position shown there, the rotation about the axis 50 does not cause the driven member 36 to move along the axis 78 of the driven member. As can be seen in FIG. 5, the axis 78 of the driven member and the axis 58 of the drive member are not aligned with one another. As the seed meter 24 rotates about the axis 50, the driven member axis will come into alignment with the drive member axis. The cone shaped tip 62 of the drive member will insert into the recess 80 of the driven member.

Figure 12:
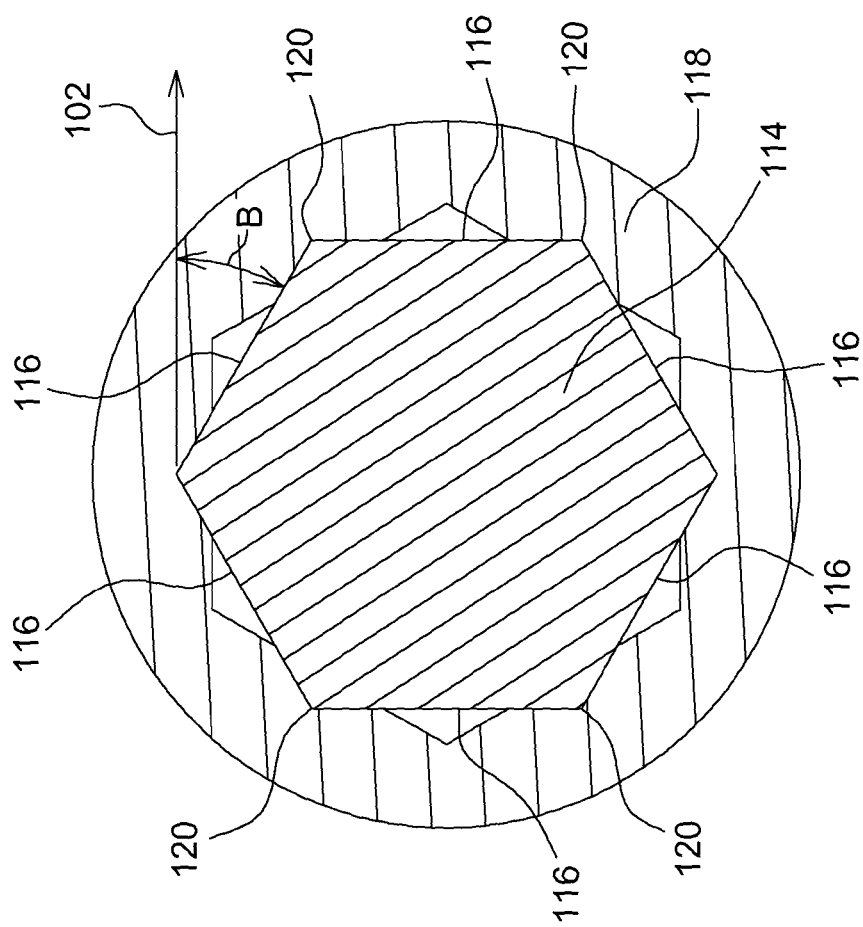
FIG. 12 is a sectional view like FIG. 11 of a previous drive coupling.
Figure 11:
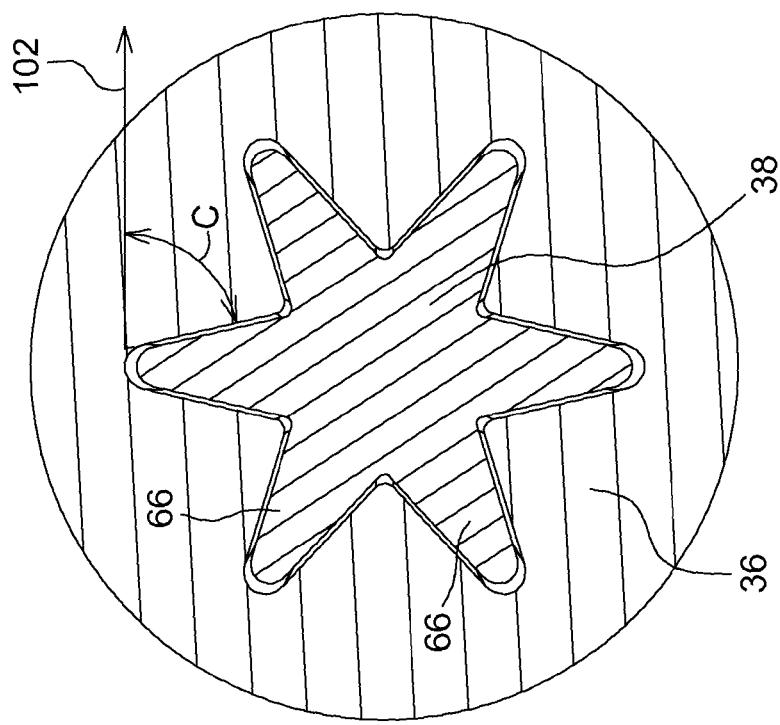
FIG. 11 is a sectional view along the line 11-11 of FIG. 10.

In the embodiment shown in FIG. 11 the side walls 70 and 72 of the vanes 66 diverge at an angle of approximately 26 degrees from one another. As a result, the side wall surface of the vane is at an angle "C" of approximately 77 degrees to the direction of the driving torque as shown by the arrow 102. The angle of 77 degrees is close to being normal to the direction of torque. As a result, the majority of the force acting on the vane and groove side walls is in the direction of torque. In a previous design, shown in FIG. 12, the drive member 114 was hex shaped with six surfaces 116 while the socket in the driven member 118 had twelve points 120. This results in an angle "D" between the faces of the drive and driven members of 30 degrees to the direction of torque. With such a small angle between the driving faces and the direction of torque, only a small portion of the normal force acting between the two surfaces is in the direction of torque. A greater force between the drive and driven member faces is required to produce the same torque. This greater force produced more wear of the drive and driven members than in the embodiment shown in FIGS. 5-11. Because the drive member 38 and driven member 36 may wear, they are mounted to the motor and seed meter in a removable fashion for replacement. The shank 82 of the driven member has threads 104 that engage threads in the meter bearing 106. The drive member may have a hex portion on 108 on the shank to drivingly connect to the motor gear 110 and may be retained by a bolt 112. One of the drive member 38 and the driven member 36 may be spring loaded in the axial direction to facilitate self-aligning and self-engaging with one another.

While the drive coupling first member, the drive member 38 has the cone shaped head and the drive coupling second member, the driven member 36 has the recess 80, it will be apparent to those in the mechanical arts that the cone and recess could be on the opposite members. Additionally, while the drive coupling has been shown and described in the context of a motor and seed meter, the drive member and driven member of the drive coupling may be joined to other devices. For example, the seed delivery system 26 may be driven through such a drive coupling. Furthermore, the motor may be a hydraulic or pneumatic motor or may not be a motor at all. For example, the drive member 38 could be connected to a gear box or other component of a drive train that itself is driven by a motor or mechanically by a chain, cable, belt, etc. As a result of these variations in the use of the drive coupling, the claims use generic terminology such as first and second "devices" instead of motor and seed meter. Furthermore, the claims also refer to the first and second "members" of the drive coupling since, as described above, either member may include the cone shaped tip 62 and either member may include the recess 80.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Any words of orientation, such as various forms of "up", "down", "top", "bottom," "above," "below", "distal", and "proximal" used herein are for the purpose of describing particular embodiments only and are not intended to be limiting of the disclosure.

Accordingly, various embodiments and implementations other than those explicitly described are within the scope of the following claims.

What is claimed is:

1. An apparatus comprising:
   a frame,
   a first device for rotationally driving a second device, the first and second devices being supported by the frame, one of the first and second devices being mounted to the frame for movement between a use position in which the first and second devices are drivingly coupled to one another and a service position in which the first and second devices are drivingly de-coupled from one another;

a drive coupling drivingly connecting the first and second devices when the one of the first and second devices mounted to the frame for movement is in the use position, the drive coupling having a first member and a second member wherein:

the drive coupling first member having an axially extending first shank with a plurality of vanes extending axially of the shank and having radially outer edges that diverge radially outwardly from a point at a distal end of the drive coupling first member shank forming a cone shaped tip at the distal end of the drive coupling first member;

the drive coupling second member having an axially extending second shank with a distal end having a recess with a plurality of radial grooves which converge to a tip at an inner end of the recess spaced axially inward from the distal end of the drive coupling second member; and one member of the drive coupling being mounted to each of the first and second devices to drivingly connect when the movable device is moved into the use position by insertion of the vanes of the drive coupling first member into the grooves in the drive coupling second member.

2. The apparatus of claim 1 wherein the vanes having flat side walls and the grooves have flat side walls for surface-to-surface engagement with the side walls of the vanes.

3. The apparatus of claim 2 wherein the side walls of the vanes diverge radially inwardly from the outer edges of the vanes and the groove side walls also diverge radially inwardly from a base of each groove.

4. The apparatus of claim 3 wherein the side walls of the vanes diverge at an angle of 40 degrees or less.

5. The apparatus of claim 3 wherein the side walls of the vanes diverge at an angle between 20 and 40 degrees.

6. The apparatus of claim 1 wherein the drive coupling first member has 6 vanes and the drive coupling second member has 6 grooves.

7. The apparatus of claim 1 wherein the drive coupling first member has 5 vanes and the drive coupling second member has 5 grooves.

8. The apparatus of claim 1 wherein the drive coupling first member has 4 vanes and the drive coupling second member has 4 grooves.

9. The apparatus of claim 1 wherein the angle of the outer edges of each vane relative to the shank axis is less than 30 degrees.

10. The apparatus of claim 1 wherein the vanes diverge radially outwardly in an axial direction from the distal end of the shank to a proximal end of the vanes where the vanes extend radially outward further than a nominal diameter of the first shank.

11. The apparatus of claim 10 further comprising a radially extending flange at the proximal end of the vanes on the drive coupling first member.

12. The apparatus of claim 1 wherein the first device is one of a motor and a seed meter and wherein the second device is the other one of a motor and a seed meter.

13. The apparatus of claim 1 wherein the first device is one of a motor and a seed delivery system and wherein the second device is the other one of a motor and a seed delivery system.

* * * * *